United States Patent [19]

Helm

[11] Patent Number: 6,096,357
[45] Date of Patent: Aug. 1, 2000

[54] METHOD OF BAKING OR COOKING FOOD IN AN ENVIRONMENT-PROTECTING AND SAFE WAY

[75] Inventor: Peter Helm, Maisach, Germany

[73] Assignee: Eloma GmbH Grobkuchentechnik, Maisach, Germany

[21] Appl. No.: 09/250,627

[22] Filed: Feb. 16, 1999

[30]  Foreign Application Priority Data

Feb. 13, 1998 [EP] European Pat. Off. ............. 98102565

[51] Int. Cl.⁷ ....................................................... A23L 1/00
[52] U.S. Cl. ........................... 426/233; 426/510; 426/523
[58] Field of Search ..................................... 426/510, 523, 426/233; 99/330, 473, 474

[56]  References Cited

U.S. PATENT DOCUMENTS 4,506,598  3/1985  Meister ...................................... 99/330
5,209,941  5/1993  Wuest ...................................... 426/510

FOREIGN PATENT DOCUMENTS 0 319 673 A1  12/1988  European Pat. Off. .
0 624 759 A1  10/1994  European Pat. Off. .

Primary Examiner—George C. Yeung
Attorney, Agent, or Firm—Gardner, Carton & Douglas

[57]  ABSTRACT

The present invention relates to a method of baking or cooking food in an environment-protecting and safe way in preferably program-controlled baking-, hot air-, combined steam devices or steam cooking devices, wherein considerable, possibly overheated amounts of steam are produced during baking or cooking and remain in the device when the baking or cooking process has finished. In accordance with the invention, a removal of dampness from the cooking space is always performed prior to the termination of the baking or cooking process.

3 Claims, No Drawings

METHOD OF BAKING OR COOKING FOOD IN AN ENVIRONMENT-PROTECTING AND SAFE WAY

BACKGROUND OF THE INVENTION

The present invention relates to a method of baking or cooking food in an environment-protecting and safe way.

Methods of baking or cooking are performed in large-kitchen technology, other than in private households, by means of baking or cooking methods in devices that are designed as baking-, hot air-, combined steam devices or steam cooking devices. In the course of baking or cooking, considerable amounts of steam are produced due to steaming and/or the natural moisture of the product to be baked or cooked, which will remain in the cooking space or in the device, respectively, after baking or cooking has finished.

In the case of the previous methods or devices, respectively, the access door is opened after the baking or cooking procedure has finished, so that the amount of steam contained in the device or the cooking space escapes abruptly or almost abruptly.

Since it is not only the matter of considerable amounts of steam, but as a rule also of hot or overheated steam, the operator runs a great risk to be scalded, in particular in the region of his or her face or arms. Nowadays, the risk for the operator is still enhanced since increasingly bad-trained and bad-introduced staff or non-introduced ancillary staff, respectively, operates the devices.

In order to avoid this disadvantage, it has been known from the state of the art to make use of a two-stage door closure. The first opening stage of the closure allows for a controlled and directed escaping of the steam from the cooking space. In this stage, the door is opened by approximately 10 to 20 mm and is mechanically maintained in this position. By a further movement of the closure grip the door subsequently may be opened completely.

This auxiliary mechanism of a two-stage door opening can, however, be overcome by a correspondingly quick operating of the lock, so that no safety with respect to corresponding scalding risks is provided in this case.

Not only with this auxiliary mechanism, but also without his auxiliary mechanism, considerable problems harmful to the environment occur due to the repeated abrupt escaping of steam. First of all, the steam escaping without any hindrances to the kitchen area do relatively quickly lead to a considerable negative effect on the climate in the room and on the staff working therein.

The rooms in which devices of this kind are installed are, due to the distinctly higher contents of dampness in the atmosphere of the room, also suffering in the long term. This expresses itself for instance in the flaking off of colour and/or by the forming of mould on the walls and ceilings.

Another disadvantage is that despite generously calculated sucking devices the abruptly occurring large amounts of steam can also be mastered insufficiently only, or they have to be dimensioned correspondingly largely, which does not only render them expensive in their production, but also in their maintenance.

EP 624 759 A1 discloses a steam device in which considerable, possible overheated amounts of steam are produced during the baking or cooking process, respectively, and remain in the device until the baking or cooking process, respectively, has finished. Some minutes prior to the termination of the cooking process the production of steam is interrupted, and control means operate a device for opening the valve of an escape opening through which the steam may escape.

EP 319 673 A1 discloses a device for controlling a cooking device operated with steam and a method for operating such a device, wherein towards the end of the cooking phase steam is removed from the cooking space to the suction side of a fan through a controllable steam escape opening, and simultaneously, air is supplied to the cooking space through a controllable air supply opening from the pressure channel of the fan. In this way, the steam in the cooking space is to be reduced to such an extent that no more disturbing steam escapes on opening of the oven door.

It is a disadvantage of the method or the devices, respectively, according to the state of the air that an exact removal of the steam both with respect to time and amount is not guaranteed. In accordance with EP 624 759 A1 the letting off of steam starts some minutes prior to the end of the cooking process which, on the one hand, is a very vague indication and, on the other hand, does not guarantee for an exact and complete removal of the steam. In the case of the device according to EP 0 319 673 A1 the steam producer is switched off until the actual end of the program, and the steam prevailing within the oven is reduced to such an extent that hardly any more steam escapes on opening of the oven door. This shows that some steam remains in each case, which then escapes abruptly on opening of the door.

It is therefore the object of the present invention to provide a method of the kind initially mentioned, with which a minimal duration of time is achieved with simultaneous optimum removal of steam.

In accordance with the invention, the program control of the device initiates the removal of dampness, as a function of the dampness in the cooking space determined, prior to the termination of the baking or cooking process, the duration of the removal of dampness depending on the dampness the cooking space determined.

SUMMARY OF THE INVENTION

It therefore is the object of the present invention to improve a conventional method of baking or cooking food such that risks for the operating staff, in particular by scalding, are avoided on the one hand, and that abruptly occurring steam loads for the kitchen and their disadvantages are avoided on the other hand.

DETAILED DESCRIPTION OF THE INVENTION

By performing a removal of dampness from the cooking space or the cooking device, respectively, before termination of the cooking process, it is avoided that scalding of the operator becomes possible.

On opening of the access or the door, respectively, of the device, no or almost no steam thus escapes anymore, so that the hot air escaping instead does not result in any further loads for the kitchen climate and can quickly be caught by means of corresponding ventilation.

The baking or cooking of food is substantially performed by means of program-controlled devices with which corresponding baking or cooking programs may be selected. Particularly advantageously, the program control of the device initiates the removal of dampness by a predetermined time interval prior to the termination of the baking or cooking process.

It thus is particularly advantageous that, on the one hand, no prolongation of the baking or cooking process results as compared to previous baking or cooking times and, on the other hand, no loss of quality of the food to be baked or cooked occurs by the removal of dampness. In the same length of the baking or cooking time the outstanding baking or cooking result so far obtained in the case of devices of this kind is maintained without loss of quality.

The afore-mentioned advantages are in particular achieved in an outstanding way when the removal of dampness is performed during 30 to 120 seconds, preferably within 60 seconds.

Alternatively, the removal of dampness is initiated as a function of the dampness ascertained in the cooking space. The dampness is measured or ascertained, respectively, and the starting point of the removal of dampness is determined by the device as a function thereof.

With a great advantage as regards baking and cooking processes that are environment-protecting and safe, the access to the device is maintained closed during the baking or cooking process until the removal of dampness has been terminated. This may be performed by corresponding program-controlled measures in cooperation with corresponding controlled door closing means. This also avoids that the access is opened at any time of the baking or cooking process and that the amount of steam contained therein can escape as before.

The method according to the invention further has the advantage that the program control releases the closure of the access to the device or the door of the device, respectively, to be opened directly after the termination of the baking or cooking process, respectively.

The removal of dampness from the cooking space may for instance be performed through an additional sucking device which is started at the desired time by program control.

Alternatively, the removal of dampness is performed by an exchange of the steam atmosphere in the cooking space by means of fresh air introduced. This fresh air is supplied through a supply channel leading to the wall portion of the cooking device opposite to the access of the cooking space, and is distributed in the cooking space by means of a ventilating wheel or a fan. By the higher pressure generated thereby, the steam is pushed out of the device through an outlet neck positioned for instance at the bottom of the cooking device, and preferably is condensed.

Thus, by means of the present invention, it is not only an optimum of protection that is achieved for the person operating such devices, but the room in which devices of this kind are installed is also protected from damage for a very long time.

What is claimed is:

1. A method of baking or cooking food in a device selected from the group consisting of a program-controlled baking device, a program-controlled hot air-steam cooking device, and a program-controlled steam cooking device, the method comprising the steps of:

baking or cooking food within the device wherein the device having a cooking space and a closure to provide access to the cooking space;

producing amounts of steam during baking or cooking of the food by at least the natural moisture of the food in the cooking space;

determining the amount of dampness within the cooking space; and removing steam from the cooking space prior to the termination of the baking or cooking of the food step according to a program control that removes dampness as a function of the determinant amount of the dampness within the cooking space.

2. The method according to claim 1, wherein the closure to the cooking space remains closed until the removal of dampness has been terminated.

3. The method according to claim 2, wherein the program-control releases the closure to the cooking space so that the access to the cooking space is opened directly after the baking or cooking process has been terminated.

* * * * *